(12) United States Patent
Lodolo

(10) Patent No.: US 7,688,464 B2
(45) Date of Patent: Mar. 30, 2010

(54) P2P PRINTING SYSTEM AND METHOD

(75) Inventor: Francesco Lodolo, London (GB)

(73) Assignee: Xerox Corporation, Norwalk, CT (US)

( * ) Notice: Subject to any disclaimer, the term of this patent is extended or adjusted under 35 U.S.C. 154(b) by 1105 days.

(21) Appl. No.: 11/303,628

(22) Filed: Dec. 16, 2005

(65) Prior Publication Data

US 2007/0139693 A1    Jun. 21, 2007

(51) Int. Cl.
*G06F 15/00* (2006.01)
*G06F 15/16* (2006.01)

(52) U.S. Cl. ...................... 358/1.15; 709/203

(58) Field of Classification Search ............... 358/1.15, 358/1.14, 1.16, 1.13, 1.11, 3.24, 1.6, 406, 358/504, 402, 521, 1.9, 1.18; 156/344, 247, 156/542; 715/738; 710/15; 709/203, 206, 709/217, 219, 227; 400/88, 103, 490
See application file for complete search history.

(56) References Cited

U.S. PATENT DOCUMENTS

| | | | |
|---|---|---|---|
| 2001/0038462 A1* | 11/2001 | Teeuwen et al. | ........... 358/1.15 |
| 2003/0063771 A1 | 4/2003 | Morris et al. | |
| 2003/0182428 A1 | 9/2003 | Li et al. | |
| 2005/0216473 A1 | 9/2005 | Aoyagi et al. | |

FOREIGN PATENT DOCUMENTS

WO    WO 03/075168 A1    9/2003

\* cited by examiner

*Primary Examiner*—Saeid Ebrahimi Dehkordy
(74) *Attorney, Agent, or Firm*—Fay Sharpe LLP

(57) ABSTRACT

A P2P printing system and method is disclosed. The printing comprising a system computer readable storage medium, storing instructions that, when executed, cause a printing device to perform a method. The method comprising establishing communications between one or more other printing devices, each printing device capable of sharing files with the other printing devices via a P2P file sharing network.

2 Claims, 4 Drawing Sheets

P2P PRINTING SYSTEM AND METHOD

BACKGROUND

Traditionally, some printing systems include the transfer of a print file from a computer device, such as a personal computer or server, to a printer through a network or other connection between the computing device and the printer. Other printing systems utilize a Multi-Functional Device (MFD). The MFD includes the scanning of a document and printing of a document all within a stand alone unit. In addition to operating as a stand alone printing system, some MFDs can communicate with a server or other computer to receive print files and print these print files.

The server or computer associated with the traditional printing system described above, can store a print file associated with a scanned document or application program such as word. To print a document associated with the print file, requires a user to interface with the server or computer via a terminal or other device. The print file is transferred to a printer and a document is printed. To print this same document at another future time, the user must repeat these steps and the computer or server will transfer the print file to the printer for printing. Other variations of this printing system include a multiple printer network where a specific printer can be selected by the user for printing.

INCORPORATION BY REFERENCE

U.S. patent application publication No. 2005/0216473 A1, by Aoyagi et al., entitled P2P Network System, published Sep. 29, 2005, discloses a P2P Network System and is hereby totally incorporated by reference.

PCT International Publication Number WO 03/075168 A1, Net2Printer, Inc., discloses "A System for Peer-to-Peer Transport of Documents", published Sep. 12, 2003 and is hereby totally incorporated by reference.

U.S. patent application publication No. 2003/0182428 A1, by Li et al., entitled "Peer-to-Peer (P2P) communication System", published Sep. 25, 2003, discloses a P2P Network System and is hereby totally incorporated by reference.

U.S. patent application publication No. 2003/0063771 A1, by Morris et al., entitled "Network-Based Photosharing Architecture for Search and Delivery of Private Images and Metadata", published Apr. 3, 2003, discloses a P2P Network System and is hereby totally incorporated by reference.

BRIEF DESCRIPTION

In accordance with one aspect of this disclosure, a printing apparatus is provided. The printing apparatus comprising a computer readable storage medium, storing instructions that, when executed, causes a printing device to perform a method. The method establishing communications between one or more other printing devices, each printing device capable of sharing files with the other printing devices via a P2P file sharing network and each of the said one or more other printing devices comprising a storage medium housed within the printing device and operatively connected to the P2P file sharing network.

In accordance with another aspect of this disclosure, a printing system is provided. The printing system comprising one or more printing devices. Each printing device comprising a computer readable storage medium, a document scanner; a P2P file sharing network; and a computer, wherein the one or more printing devices and the computer are operatively connected to the P2P file sharing network.

In accordance with another aspect of this disclosure, a P2P method is disclosed. The method comprising storing a digital representation of a document on a computer readable storage medium housed and operatively connected to a printing device. The method establishing communications between the printing device and one or more other printing devices, where each printing device is capable of sharing files with the other printing devices via a P2P file sharing network.

DETAILED DESCRIPTION

As discussed in the Background section of this disclosure, traditional printing systems and methods require the use of a central computer or server to provide multiple printers access to a specific print file representing a document to be printed. Stand alone MFDs can include a storage medium to provide a user with the ability to print a previously scanned document from the originally scanning MFD.

This disclosure provides a printing system and method to provide a user with access to a network of printers, without the need for the printers to communicate with a network server. This printing system and method includes a Peer-to-Peer (P2P) network which enables direct file sharing between all printers connected to the printing network. In other words, a user can access all printing files stored on each printer from any printer or computer connected to the printer P2P network. The printing system and method disclosed eliminates the need for a central server for routing print files to network printers.

Figure 1:
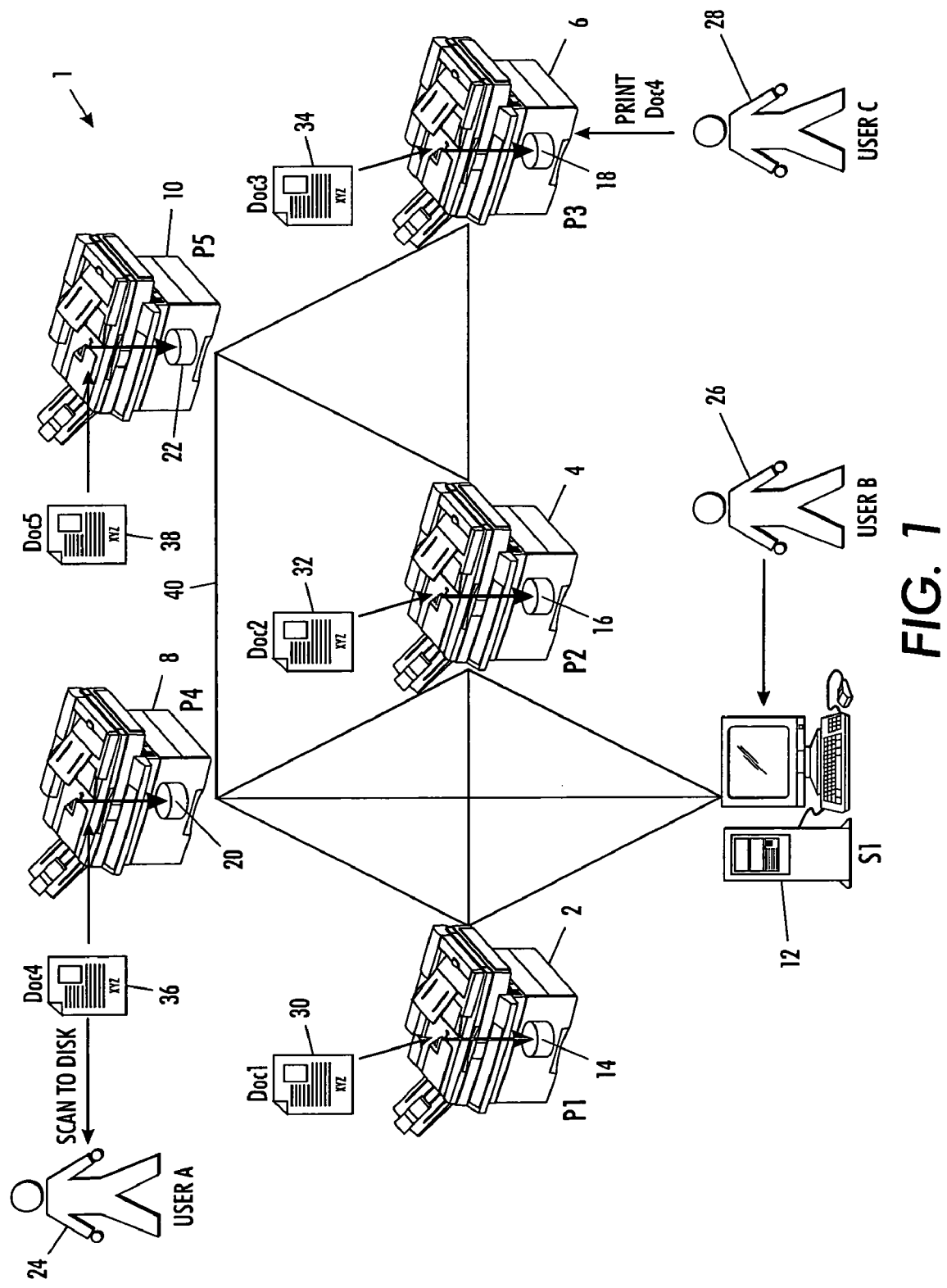
FIG. 1 is a diagram illustrating a printing system and method according to an exemplary embodiment of this disclosure.

With reference to FIG. 1, illustrated is a diagram that illustrates a printing system 1 and method according to one embodiment of this disclosure.

The printing system includes multiple printers P1 2, P2 4, P3 6, P4 8 and P5 10. The printers are interconnected via network hardware 40 and communicate via the network hardware 40. In addition to the printers, a computer S112 is interconnected via the network hardware 40 and can communicate with printers P1 2, P2 4, P3 6, P4 8 and P5 10.

For illustration purposes, user A 24, user B 26, and user C 28 are positioned at printer P4 8, computer S1, and printer P3 6, respectively. As will be discussed further below, each printer includes a hard drive or other internal memory device and a document scanner. Specifically, printer P1 2 includes a hard drive 14 and is associated with document DOC1 30, printer P2 4 includes a hard drive 16 and is associated with document DOC2 32, printer P3 6 includes a hard drive 18 and is associated with document DOC3 34, printer P4 8 includes a hard drive 20 and is associated with document DOC4 36 and printer P5 10 includes a hard drive 22 and is associated with document DOC5 38.

In addition to the printers described a computer S1 12 is connected to the network 40. The computer 12 provides access to files stored on the respective printers.

To provide P2P file sharing among printers P1 2, P2 4, P3 6, P4 8 and P5 10, a P2P file sharing protocol is executed by each printing device. This P2P file sharing software is stored and executed by each printing device, independently from the others. One system to implement a P2P network includes a Linux based printing device utilizing a P2P file sharing service based on Gnutella file sharing technology. However, other P2P file sharing service technologies are available, such as Napster, Freenet and Groove.

The operation of the printing system 1 and method described with reference to FIG. 1 is now described with further detail.

As an example of an exemplary embodiment FIG. 1 illustrates one possible configuration of multiple printers operatively connected via a P2P network. In operation, user A 24 scans document DOC4 36 into printer P4 8 which stores the DOC4 36 data file to the printer hard disk 20, other users (not shown) subsequently scan document DOC1 30, document DOC3 34 and document DOC5 38, which files are stored on their respective hard disks housed within the respective printers P1 2, P3 6 and P5 10, respectively.

It should be noted that in addition to scanning and digital storage of the documents, a user may choose to print the document. For example, user A 24 may scan document DOC4 36 into printer P4 8, printer P4 8 subsequently printing DOC 4 36.

Subsequent to the scanning of DOC1 30, DOC2 32, DOC3 34, DOC4 36, and DOC5 38, user C 28 is stationed at printer P3 6 and requires a print of DOC4 36. User C 28 will then query the printers via printer P3 6 installed software to retrieve the DOC4 36 print file from any printer or computer connected to the P2P network 40 which has the DOC4 36 print file stored on hard disk. The P2P printing system 1 illustrated in FIG. 1 enables printer P3 6 to access and retrieve the DOC4 36 print file from printer P4 hard drive 20 via the P2P network 40. Moreover, the P2P printing system 1 enables document DOC 4 36 to be retrieved and printed at any printer, P1 2, P2 4, P3 6, P4 8 and P5 10, which is operatively connected to the P2P network 40. In addition, a user B 26 can retrieve document DOC4 36 and view document DOC4 36 via the computer S1 12 and associated terminal.

The P2P file sharing network disclosed provides file sharing capability among printing devices and other computer devices, without the need for a centralized server to manage the file sharing among these devices.

Figure 2:
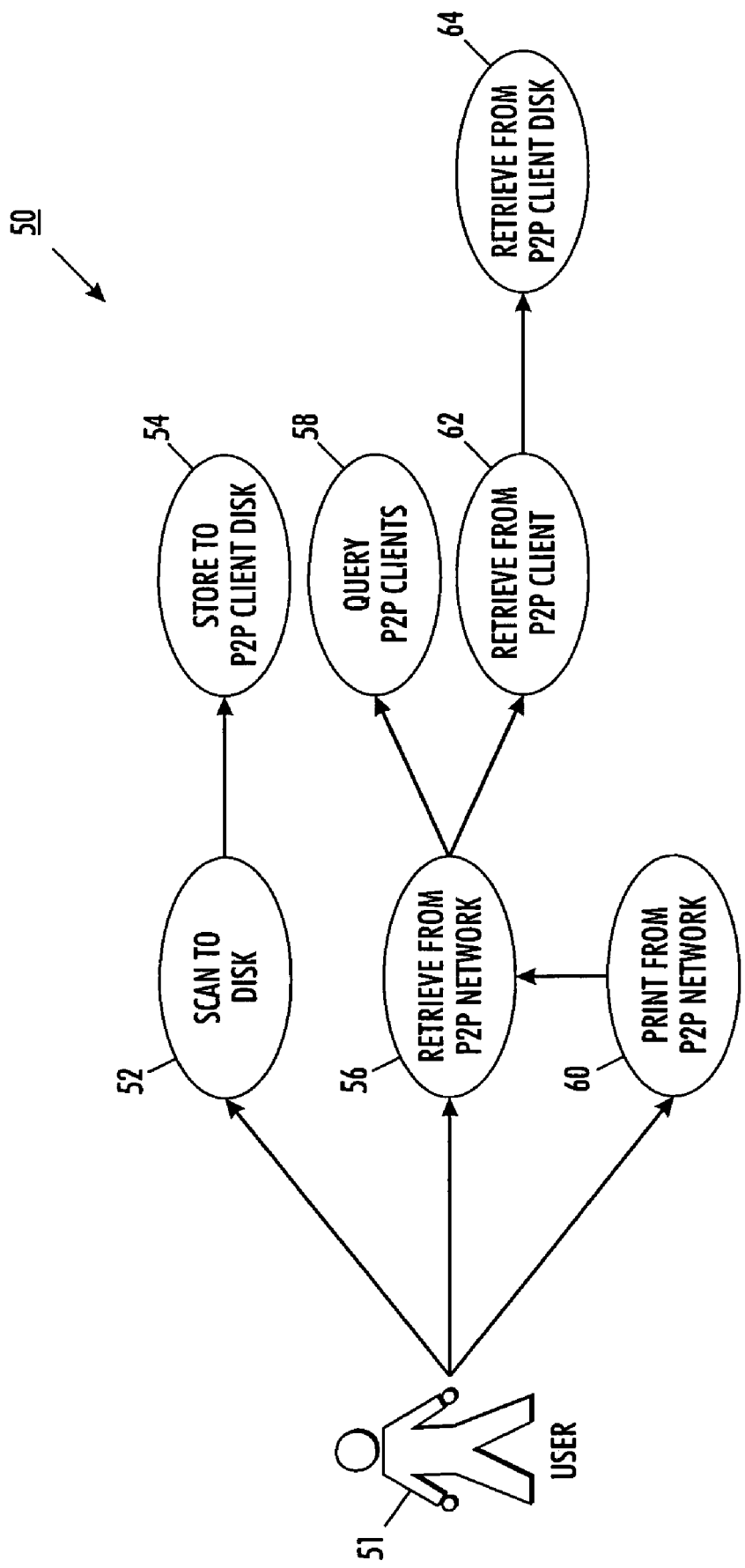
FIG. 2 is a flow chart illustrating a printing system and method according to an exemplary embodiment of this disclosure.

With reference to FIG. 2, illustrated is a flow chart 50 which provides an exemplary method of operation, as related to a P2P printing system.

A user, stationed at one of a plurality of printing devices which are integrated via a P2P network, is able to command a printing device via a controller, to 1) scan the disk 52, 2) retrieve a file from the P2P network 56, and/or 3) print a file from the P2P network 60.

The operation of scan to disk 52 scans the user fed document and stores 54 the file on the respective P2P client disk, i.e. the printer hard disk associated with the scanner.

The operation, of retrieving 56 a file from the P2P network, queries 58 the P2P clients, i.e. printer hard drives, to determine the print files associated with each P2P client. Subsequently, the user requested print file is retrieved 62 from the appropriate P2P client and subsequently retrieved 64 from the associated P2P client disk.

The operation of printing from the P2P network, includes initially executing a command to retrieve 56 the relevant print file from the P2P network as described above. After the print file is retrieve 56, the print file is printed at the user requested printer.

Figure 3:
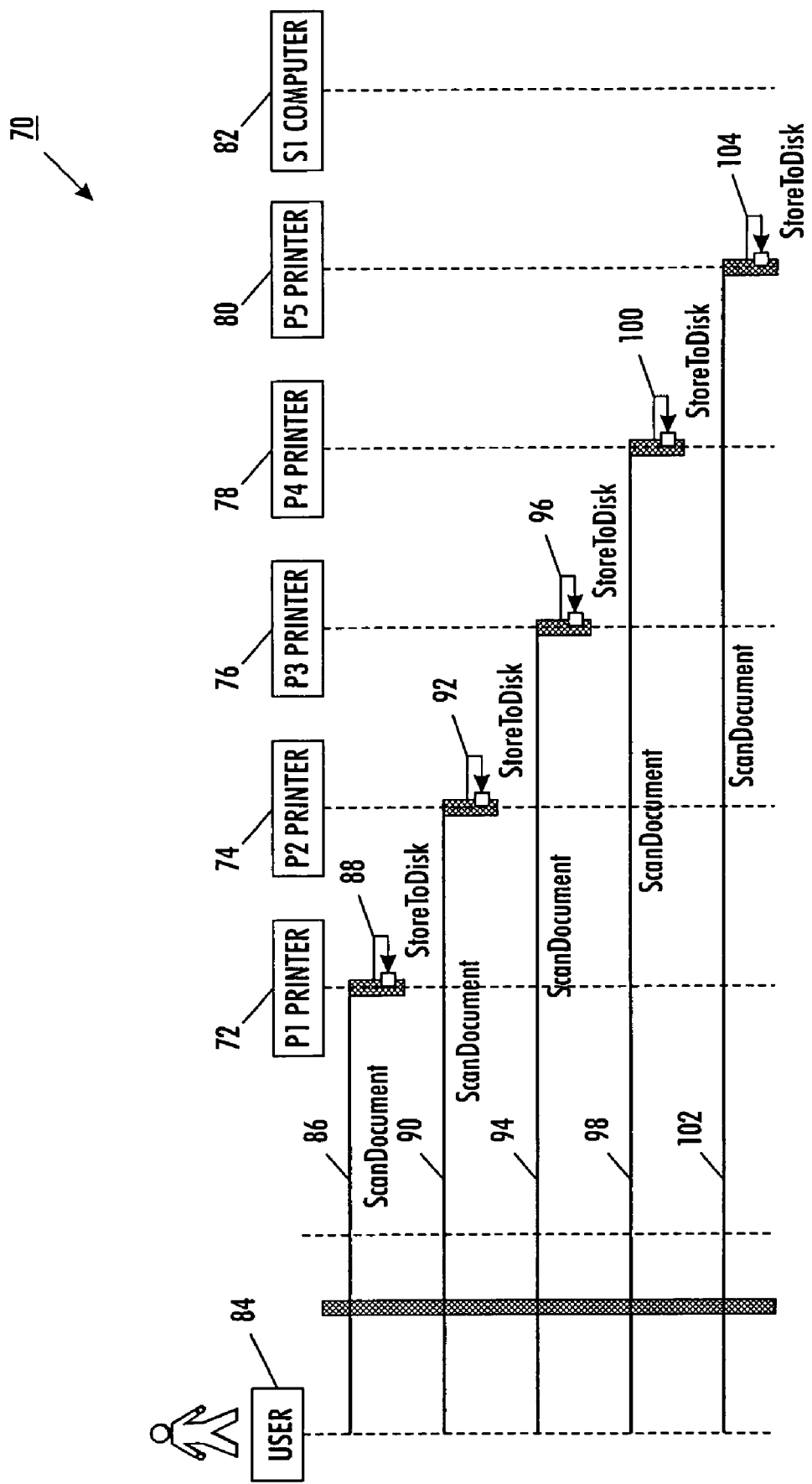
FIG. 3 is a sequencing diagram illustrating the operation of a printing system according to an exemplary embodiment of this disclosure.
Figure 4:
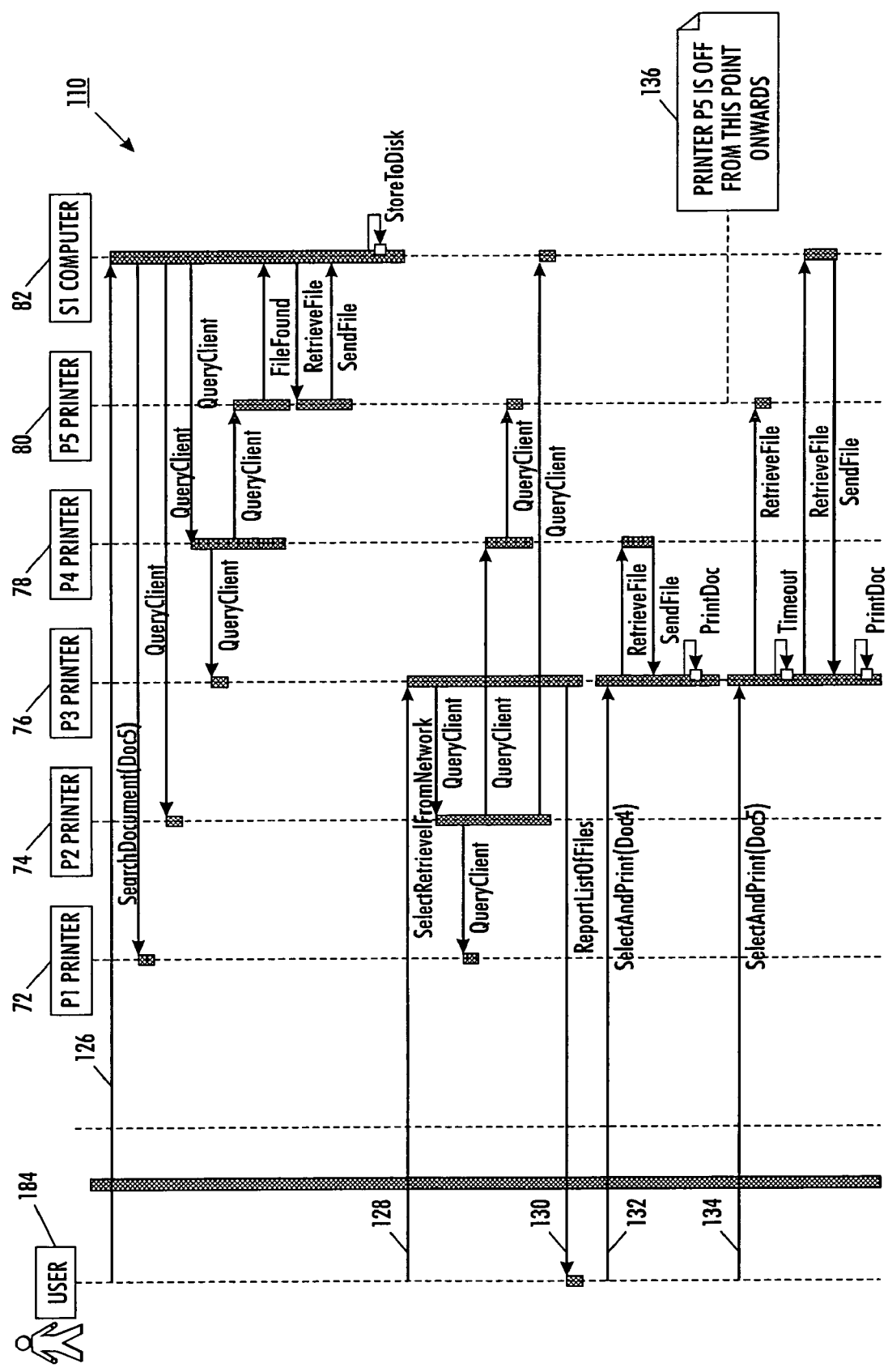
FIG. 4 is a sequencing diagram illustrating the operation of a printing system according to one exemplary embodiment of this disclosure.

To further illustrate the P2P printing system and method as disclosed, FIG. 3 and FIG. 4 provide examples of user initiated instructions for operating a P2P printing system as discussed with reference to FIG. 1.

The printing system 70 illustrated includes one or more users 84, printer P1 72, printer P2 74, printer P3 76, printer P4 78, printer P5 80 and computer 82.

The operations executed are as follows:

User scans document 86 at printer P1 72, and printer P1 72 stores 88 the scanned document file on the printer P1 72 hard disk or other digital storage device.

User scans 90 document at printer P2 74, and printer P2 74 stores 92 the scanned document file on the printer P2 74 hard disk or other digital storage device.

User scans 94 document at printer P3 76, and printer P3 76 stores 96 the scanned document file on the printer P3 76 hard disk or other digital storage device.

User scans 98 document at printer P4 78, and printer P4 78 stores 100 the scanned document file on the printer P4 78 hard disk or other digital storage device.

User scans 102 document at printer P5 80, and printer P5 80 stores 104 the scanned document file on the printer P5 80 hard disk or other digital storage device.

Subsequent to the storage of the scanned documents on their respective printer hard drives or other digital storage device, the possible sequence of operations illustrated in FIG. 4 is executed.

The operations 110 include:

A user stationed at computer S1 82 executes a search and retrieve command 126 from computer S1 82. Initially, the computer queries printer P1 72 hard drive via the P2P network, then printer P2 74 hard drive via the P2P network, and then printer P4 78 via the P2P network.

Printer P3 76 and printer P5 80 are then queried via printer P4 78, the user requested print file found on printer P5 80.

Subsequently, computer S1 82 sends a retrieved file request to printer P5 80 which sends the file via the P2P network to computer S1 82. Computer S1 82 stores the file to an associated hard disk or other digital storage device.

Other possible user initiated commands executed by the P2P printing system include a select and retrieval function 128 which reports 130 a list of files available from the P2P network. Also illustrated are a select and print (DOC4) 132 and select and print (DOC5) 134 instruction sequencing operation. The select and print (DOC5) 135 executed subsequent to printer P5 80 being turned off 136.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A printing system comprising:
a first printing device; a second printing device, and a third printing device, the first printing device operatively connected to the second printing device, the second printing device operatively connected to the first and third printing devices, the third printing device operatively connected to the second printing device, and the first and third printing devices are not operatively connected to each other;

the first printing device including a computer readable storage medium, storing instructions that, when executed, cause the first printing device to establish a P2P file sharing network with the second printing device;

the second printing device including a computer readable storage medium, storing instructions that, when executed, cause the second printing device to establish a P2P file sharing network with the first and third printing devices;

the third printing device including a computer readable storage medium, storing instructions that, when executed, cause the third printing device to establish a P2P file sharing network with the second printing device;

the first printing device configured to search for and print a document file on the first printing device and request the second printing device to search for the document file in the event the document file is not found on the first printing device;

the second printing device configured to search for the document file on the second printing device at the request of the first printing device, communicate the document file to the first printing device for printing via the P2P file sharing network, and request the third printing device to search for the document file in the event the document file is not found on the second printing device; and, the third printing device configured to search for the document file on the third printing device in the event the document file is not found on the first and second printing devices and communicate the document file to the second printing device via the P2P filed sharing network.

2. A method of printing a digital representation of a document on a first printing device using a printing system including the first printing device; a second printing device; and a third printing device; the first printing device operatively connected to the second printing device, the second printing device operatively connected to the first and third printing devices, the third printing device operatively connected to the second printing device, and the first and third printing devices are not operatively connected to each other, the method comprising:

storing a digital representation of a document on a computer readable medium housed within one of the first printing device, the second printing device, and the third printing device;

the first printing device and the second printing device establishing a P2P file sharing network;

the second printing device and the third printing device establishing a P2P file sharing network;

the first printing device executing instructions to search for and print a document file on the first printing device and request the second printing device to search for the document file in the event the document file is not found on the first printing device;

the second printing device executing instructions to search for the document file on the second printing device at the request of the first printing device, communicate the document file to the first printing device for printing via the P2P file sharing network, and request the third printing device to search for the document file in the event the document file is not found on the second printing device;

the third printing device executing instructions to search for the document file on the third printing device in the event the document file is not found on the first and second printing devices and communicate the document file to the second printing device via the P2P file sharing network, the second printing device communicating the document file communicated from the third printing device to the first printing device for printing via the P2P file sharing network.

* * * * *